US008509762B2

(12) United States Patent
Li et al.

(10) Patent No.: US 8,509,762 B2
(45) Date of Patent: Aug. 13, 2013

(54) METHODS AND APPARATUS FOR UNDERPERFORMING CELL DETECTION AND RECOVERY IN A WIRELESS NETWORK

(75) Inventors: Zhefeng Li, Morristown, NJ (US); Kyounghwan Lee, Herndon, VA (US); Mustafa E. Sahin, Ashburn, VA (US); Osama Tarraf, Ashburn, VA (US)

(73) Assignee: Reverb Networks, Inc., Ashburn, VA (US)

( * ) Notice: Subject to any disclaimer, the term of this patent is extended or adjusted under 35 U.S.C. 154(b) by 1 day.

(21) Appl. No.: 13/353,893

(22) Filed: Jan. 19, 2012

(65) Prior Publication Data

US 2012/0295609 A1  Nov. 22, 2012

Related U.S. Application Data

(60) Provisional application No. 61/488,278, filed on May 20, 2011, provisional application No. 61/489,369, filed on May 24, 2011.

(51) Int. Cl.
*H04W 24/00* (2009.01)
(52) U.S. Cl.
USPC ..... 455/423; 455/422.1; 455/446; 455/452.1; 455/452.2
(58) Field of Classification Search
USPC   455/422.1, 423–425, 446–451, 452.1–452.2, 455/453, 571
See application file for complete search history.

(56) References Cited

U.S. PATENT DOCUMENTS

| 5,425,051 | A | 6/1995 | Mahany |
| 5,796,722 | A | 8/1998 | Kotzin et al. |
| 5,802,144 | A | 9/1998 | Laird et al. |
| 5,859,839 | A | 1/1999 | Ahlenius et al. |
| 6,051,408 | A | 4/2000 | Bartsch et al. |
| 6,069,871 | A | 5/2000 | Sharma et al. |
| 6,115,393 | A | 9/2000 | Engel et al. |

(Continued)

FOREIGN PATENT DOCUMENTS

| EP | 2129175 | 12/2010 |
| EP | 1952657 | 8/2011 |
| WO | WO 2007/063426 A2 | 6/2007 |

OTHER PUBLICATIONS

International Search Report and Written Opinion mailed Jun. 18, 2010 for PCT Application No. PCT/US2010/31603.

(Continued)

*Primary Examiner* — Wayne Cai
(74) *Attorney, Agent, or Firm* — Cooley LLP

(57) ABSTRACT

In some embodiments, an apparatus includes a monitor module, a detector module and an adjustment module. The monitor module is configured to receive a set of indicators from a wireless network. The detector module is configured to detect an underperformance condition during a time period and within a first cell of the wireless network based on the set of indicators. The adjustment module is configured to iteratively adjust a parameter associated with a second cell of the wireless network to produce an adjusted parameter. The adjustment module is configured to send the adjusted parameter to the wireless network to improve performance of the wireless network. The adjustment module is configured to restore, after the time period, the parameter associated with the second cell to a value equal to a value for the parameter prior to the time period, and send that value of the parameter to the wireless network.

26 Claims, 6 Drawing Sheets

(56) References Cited

U.S. PATENT DOCUMENTS

| | | | |
|---|---|---|---|
| 6,138,016 A | 10/2000 | Kulkarni et al. | |
| 6,141,565 A | 10/2000 | Feuerstein et al. | |
| 6,253,077 B1 | 6/2001 | Burt et al. | |
| 6,304,556 B1 | 10/2001 | Haas | |
| 6,400,335 B1 | 6/2002 | Weaver et al. | |
| 6,545,690 B1 * | 4/2003 | Hernandez, III | 715/762 |
| 6,549,529 B1 | 4/2003 | Drabeck et al. | |
| 6,574,477 B1 | 6/2003 | Rathunde | |
| 6,729,929 B1 | 5/2004 | Sayers et al. | |
| 6,829,491 B1 | 12/2004 | Yea et al. | |
| 6,842,431 B2 | 1/2005 | Clarkson et al. | |
| 6,937,863 B1 | 8/2005 | Gordon et al. | |
| 6,985,704 B2 | 1/2006 | Yang et al. | |
| 6,999,766 B1 | 2/2006 | Padovani | |
| 7,006,805 B1 | 2/2006 | Sorrells et al. | |
| 7,016,685 B1 | 3/2006 | Cain et al. | |
| 7,149,478 B2 | 12/2006 | Hawe | |
| 7,260,415 B1 | 8/2007 | Oh | |
| 7,323,945 B2 | 1/2008 | Cyr et al. | |
| 7,349,765 B2 | 3/2008 | Reaume et al. | |
| 7,385,503 B1 | 6/2008 | Wells et al. | |
| 7,461,037 B2 | 12/2008 | Hätönen et al. | |
| 7,477,920 B2 | 1/2009 | Scheinert et al. | |
| 7,519,860 B2 | 4/2009 | Hätönen et al. | |
| 7,561,876 B2 | 7/2009 | Chiou et al. | |
| 7,577,103 B2 | 8/2009 | Diaz et al. | |
| 7,590,589 B2 | 9/2009 | Hoffberg | |
| 7,606,287 B2 | 10/2009 | Mahany | |
| 7,609,747 B2 | 10/2009 | Mahany | |
| 7,623,455 B2 | 11/2009 | Hilla et al. | |
| 7,653,407 B2 | 1/2010 | Backes et al. | |
| 7,663,555 B2 | 2/2010 | Caimi et al. | |
| 7,747,712 B2 | 6/2010 | Petersen et al. | |
| 7,768,968 B2 | 8/2010 | Plehn et al. | |
| 7,827,268 B2 | 11/2010 | Monier et al. | |
| 7,839,882 B2 | 11/2010 | Soliman | |
| 7,877,095 B2 | 1/2011 | Hubner et al. | |
| 7,877,108 B2 | 1/2011 | Wengerter et al. | |
| 7,899,890 B2 | 3/2011 | Petersen et al. | |
| 7,904,080 B2 | 3/2011 | Atkins et al. | |
| 7,941,136 B2 | 5/2011 | Reed et al. | |
| 7,969,896 B2 | 6/2011 | Sheinfeld et al. | |
| 8,010,469 B2 | 8/2011 | Kapoor et al. | |
| 8,018,925 B2 | 9/2011 | Noriega | |
| 8,023,529 B2 | 9/2011 | Oh et al. | |
| 8,032,131 B2 | 10/2011 | Dobson et al. | |
| 8,050,191 B2 | 11/2011 | Tirpak et al. | |
| 8,117,294 B2 | 2/2012 | Pollakowski et al. | |
| 8,144,619 B2 | 3/2012 | Hoffberg | |
| 8,185,124 B2 | 5/2012 | Antic et al. | |
| 8,208,924 B2 | 6/2012 | Han et al. | |
| 8,295,877 B2 | 10/2012 | Hui et al. | |
| 8,320,850 B1 | 11/2012 | Khlat | |
| 8,355,728 B2 | 1/2013 | Jung et al. | |
| 2003/0100344 A1 | 5/2003 | Garmonev et al. | |
| 2003/0191856 A1 | 10/2003 | Lewis et al. | |
| 2003/0229478 A1 | 12/2003 | Rappaport et al. | |
| 2004/0018839 A1 | 1/2004 | Andric et al. | |
| 2004/0117226 A1 | 6/2004 | Laiho et al. | |
| 2004/0196834 A1 | 10/2004 | Ofek et al. | |
| 2004/0229621 A1 | 11/2004 | Misra | |
| 2004/0266442 A1 | 12/2004 | Flanagan et al. | |
| 2005/0009531 A1 | 1/2005 | Lindquist et al. | |
| 2005/0176440 A1 | 8/2005 | Sang et al. | |
| 2005/0243723 A1 | 11/2005 | Randriamasy | |
| 2005/0259571 A1 | 11/2005 | Battou | |
| 2005/0277444 A1 | 12/2005 | Rensburg et al. | |
| 2006/0083170 A1 | 4/2006 | Silva et al. | |
| 2006/0221886 A1 | 10/2006 | Rao | |
| 2006/0239224 A1 | 10/2006 | Borst et al. | |
| 2006/0246844 A1 | 11/2006 | Kroboth et al. | |
| 2007/0002765 A1 | 1/2007 | Kadaba et al. | |
| 2007/0021151 A1 | 1/2007 | Mori et al. | |
| 2007/0066298 A1 | 3/2007 | Hurst | |
| 2007/0087756 A1 | 4/2007 | Hoffberg | |
| 2007/0094729 A1 | 4/2007 | Hoefelmeyer et al. |
| 2007/0147297 A1 | 6/2007 | Diaz et al. |
| 2007/0195721 A1 | 8/2007 | Backes et al. |
| 2007/0218862 A1 | 9/2007 | Tatman et al. |
| 2007/0248039 A1 | 10/2007 | Backes et al. |
| 2008/0016198 A1 | 1/2008 | Johnston-Watt et al. |
| 2008/0020801 A1 | 1/2008 | Fesas et al. |
| 2008/0039089 A1 | 2/2008 | Berkman et al. |
| 2008/0207195 A1 | 8/2008 | Ranta et al. |
| 2008/0225714 A1 | 9/2008 | Denis |
| 2008/0268833 A1 | 10/2008 | Huang et al. |
| 2008/0311924 A1 | 12/2008 | Lucidarme |
| 2009/0003236 A1 | 1/2009 | Aoyama et al. |
| 2009/0023477 A1 | 1/2009 | Staudte |
| 2009/0036116 A1 | 2/2009 | Kim et al. |
| 2009/0047968 A1 | 2/2009 | Gunnarsson et al. |
| 2009/0075648 A1 | 3/2009 | Reed et al. |
| 2009/0075655 A1 | 3/2009 | Dobson et al. |
| 2009/0112932 A1 | 4/2009 | Skierkowski et al. |
| 2009/0131038 A1 | 5/2009 | MacNaughtan et al. |
| 2009/0163223 A1 | 6/2009 | Casey |
| 2009/0221297 A1 | 9/2009 | Wengerter et al. |
| 2009/0227261 A1 | 9/2009 | Tiirola et al. |
| 2009/0257353 A1 | 10/2009 | Song et al. |
| 2009/0264130 A1 | 10/2009 | Catovic et al. |
| 2009/0312022 A1 | 12/2009 | Viorel et al. |
| 2009/0315736 A1 | 12/2009 | Reichl et al. |
| 2009/0323530 A1 | 12/2009 | Trigui et al. |
| 2010/0008293 A1 | 1/2010 | Gupta et al. |
| 2010/0046369 A1 | 2/2010 | Zhao et al. |
| 2010/0075682 A1 | 3/2010 | del Rio-Romero |
| 2010/0103911 A1 | 4/2010 | Ji |
| 2010/0111013 A1 | 5/2010 | Chou |
| 2010/0111047 A1 | 5/2010 | Yang et al. |
| 2010/0124934 A1 | 5/2010 | Mach |
| 2010/0130194 A1 | 5/2010 | Dickey |
| 2010/0149984 A1 | 6/2010 | Kapoor et al. |
| 2010/0159936 A1 | 6/2010 | Brisebois et al. |
| 2010/0190488 A1 | 7/2010 | Jung et al. |
| 2010/0203881 A1 | 8/2010 | del Rio Romero et al. |
| 2010/0214939 A1 | 8/2010 | Ryan |
| 2010/0216453 A1 | 8/2010 | Kallin et al. |
| 2010/0216467 A1 | 8/2010 | Ryan et al. |
| 2010/0216477 A1 | 8/2010 | Ryan |
| 2010/0232318 A1 | 9/2010 | Sarkar |
| 2010/0235285 A1 | 9/2010 | Hoffberg |
| 2010/0254344 A1 | 10/2010 | Wei et al. |
| 2010/0278161 A1 | 11/2010 | Ore et al. |
| 2010/0284303 A1 | 11/2010 | Catovic et al. |
| 2010/0299419 A1 | 11/2010 | Ramankutty et al. |
| 2010/0311415 A1 | 12/2010 | Hamabe et al. |
| 2010/0311421 A1 | 12/2010 | Mach |
| 2010/0325267 A1 | 12/2010 | Mishra et al. |
| 2011/0009105 A1 | 1/2011 | Lee et al. |
| 2011/0014925 A1 | 1/2011 | Antic et al. |
| 2011/0028144 A1 | 2/2011 | Catovic et al. |
| 2011/0044165 A1 | 2/2011 | Ni et al. |
| 2011/0045865 A1 | 2/2011 | Viering et al. |
| 2011/0059744 A1 | 3/2011 | Won et al. |
| 2011/0090820 A1 | 4/2011 | Hussein et al. |
| 2011/0092195 A1 | 4/2011 | Hussein et al. |
| 2011/0096687 A1 | 4/2011 | Dottling et al. |
| 2011/0105139 A1 | 5/2011 | On |
| 2011/0111700 A1 | 5/2011 | Hackett |
| 2011/0130135 A1 | 6/2011 | Trigui |
| 2011/0136478 A1 | 6/2011 | Trigui |
| 2011/0141972 A1 | 6/2011 | Oh et al. |
| 2011/0151881 A1 | 6/2011 | Chou et al. |
| 2011/0190016 A1 | 8/2011 | Hamabe et al. |
| 2011/0199985 A1 | 8/2011 | Cai et al. |
| 2011/0230222 A1 | 9/2011 | Reudink |
| 2011/0280157 A1 | 11/2011 | Suerbaum |
| 2011/0294527 A1 | 12/2011 | Brueck et al. |
| 2012/0009912 A1 | 1/2012 | Wang et al. |
| 2012/0026918 A1 | 2/2012 | Won et al. |
| 2012/0026941 A1 | 2/2012 | Ahmad et al. |
| 2012/0028584 A1 | 2/2012 | Zhang et al. |
| 2012/0028664 A1 | 2/2012 | Zhang et al. |
| 2012/0034919 A1 | 2/2012 | Nakata et al. |

| | | |
|---|---|---|
| 2012/0066377 A1 | 3/2012 | Li et al. |
| 2012/0087257 A1 | 4/2012 | Larsson et al. |
| 2012/0087269 A1 | 4/2012 | Hussein et al. |
| 2012/0147765 A1 | 6/2012 | Wigren |
| 2012/0147828 A1 | 6/2012 | Wigren |
| 2012/0170478 A1 | 7/2012 | Doettling et al. |
| 2012/0182874 A1 | 7/2012 | Siomina et al. |
| 2012/0252479 A1* | 10/2012 | Morita et al. ............... 455/452.2 |
| 2012/0264470 A1 | 10/2012 | Bajj et al. |
| 2012/0270536 A1* | 10/2012 | Ratasuk et al. ............... 455/423 |
| 2012/0295609 A1 | 11/2012 | Li et al. |
| 2012/0327797 A1 | 12/2012 | Siomina et al. |

OTHER PUBLICATIONS

U.S. Office Action mailed Oct. 13, 2010 for U.S. Appl. No. 12/385,752, filed Apr. 17, 2009.

U.S. Office Action mailed May 5, 2011 for U.S. Appl. No. 12/385,752, filed Apr. 17, 2009.

International Search Report and Written Opinion mailed Nov. 24, 2010 for PCT Application No. PCT/US2010/050627.

International Search Report and Written Opinion mailed Nov. 15, 2010 for PCT Application No. PCT/US2010/048929.

U.S. Office Action mailed Dec. 22, 2011 for U.S. Appl. No. 12/718,189, filed Mar. 5, 2010.

U.S. Office Action mailed Dec. 29, 2011 for U.S. Appl. No. 12/634,057, filed Dec. 9, 2009.

International Search Report and Written Opinion mailed Nov. 3, 2010 for PCT Application No. PCT/US2010/048927.

Amirijoo et al., "Cell Outage Management in LTE Networks," COST 2100 TD(9)941, Vienna, Austria, Sep. 28-30, 2009.

Mueller et al., "A Cell Outage Detection Algorithm Using Neighbor Cell fist Reports" 2008.

U.S. Office Action mailed Feb. 27, 2012 for U.S. Appl. No. 12/385,752, filed Apr. 17, 2009.

U.S. Office Action mailed Jun. 6, 2012 for U.S. Appl. No. 12/634,057, filed Dec. 9, 2009.

U.S. Final Office Action mailed Jul. 13, 2012 for U.S. Appl. No. 12/385,752, filed Apr. 17, 2009.

U.S. Final Office Action mailed Aug. 29, 2012 for U.S. Appl. No. 12/718,189, filed Mar. 5, 2010.

International Search Report and Written Opinion mailed Nov. 5, 2012 for PCT Application No. PCT/US2012/054204.

"Self-Optimizing Networks: The Benefits of SON in LTE," 4G americas, Jul. 2011.

International Search Report and Written Opinion mailed Feb. 5, 2013 for PCT Application No. PCT/US2012/064131.

U.S. Office Action mailed Mar. 18, 2013 for U.S. Appl. No. 12/580,604, filed Oct. 16, 2009.

Lehtimaki et al., "A SOM Based Approach for Visualization of GSM Network Performance Data," Helsinki University of Technology, 2005.

Blume et al., "Energy Savings in Mobile Networks Based on Adaptation to Traffic Statistics," Bell Labs Technical Journal 15(2), 77-94 (2010) © 2010 Alcatel-Lucent.

* cited by examiner

METHODS AND APPARATUS FOR UNDERPERFORMING CELL DETECTION AND RECOVERY IN A WIRELESS NETWORK

CROSS-REFERENCE TO RELATED APPLICATIONS

This application claims priority to and the benefit of U.S. Provisional Patent Application No. 61/488,278, filed May 20, 2011, and entitled "Critical Zone Detector," and U.S. Provisional Patent Application No. 61/489,369, filed May 24, 2011, and entitled "Self-Healing Wireless Optimization," each of which is incorporated herein by reference in its entirety.

BACKGROUND

Some embodiments described herein relate generally to self-healing optimization mechanisms for wireless networks, and, in particular, to methods and apparatus for detecting underperforming cells and recovering performance in a wireless network.

Some known wireless networks implement a network optimization process to find improved configurations and improve the performance for the wireless networks. Such known wireless networks typically rely on static methodologies for finding site locations, dimensioning and configuring the radio resources to meet specified traffic demand In the optimization process for such a known wireless network, the performance of the wireless network is typically manually monitored and the configurations for the wireless network are typically manually implemented and adjusted. Such a network optimization process, however, typically consumes a large amount of human resources and is a lengthy process. As a result, it is performed only when needed or periodically with a long duration between actual implementations.

Accordingly, a need exists for methods and apparatus for implementing a network optimization system that can automatically detect underperforming cells and adjust radio resources and network parameters to maximize the overall performance of a wireless network.

SUMMARY

In some embodiments, an apparatus includes a monitor module, a detector module and an adjustment module. The monitor module is configured to receive a set of indicators from a wireless network. The detector module is configured to detect an underperformance condition during a time period and within a first cell of the wireless network based on the set of indicators. The adjustment module is configured to iteratively adjust a parameter associated with a second cell of the wireless network to produce an adjusted parameter. The adjustment module is configured to send the adjusted parameter to the wireless network to improve performance of the wireless network. The adjustment module is configured to restore, after the time period, the parameter associated with the second cell to a value equal to a value for the parameter prior to the time period, and send that value of the parameter to the wireless network.

DETAILED DESCRIPTION

Figure 1:
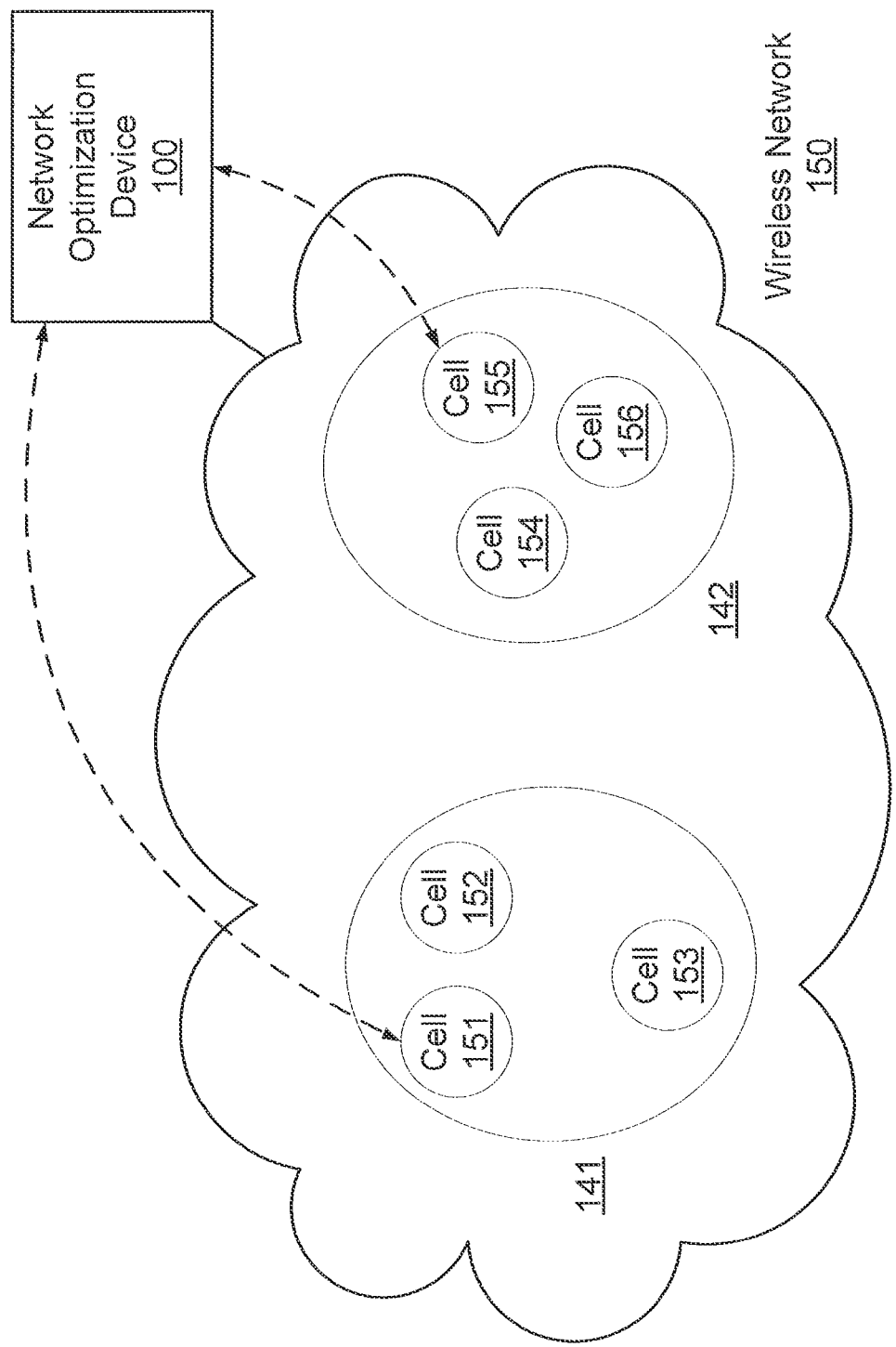
FIG. 1 is a schematic diagram that illustrates a network optimization device coupled to a wireless network, according to an embodiment.

In some embodiments, an apparatus can include a monitor module, a detector module and an adjustment module. The monitor module can be implemented in at least one of a memory or a processing device. The monitor module can be configured to receive a set of indicators from a wireless network. In some embodiments, the set of indicators can include at least one of a transmitted radio power level value of the first cell, a successful call rate (SCR) value of the first cell, traffic statistical values associated with the first cell, handover statistical values associated with the first cell, or a drop call rate (DCR) value associated with the first cell. In some embodiments, the set of indicators can also include at least one of a performance indicator, a mobile level measurement, a network configuration parameter, or an indication of a network alarm.

The detector module can be operatively coupled to the monitor module and configured to detect an underperformance condition during a time period and within a first cell from a set of cells of the wireless network based on the set of indicators. In some embodiments, the underperformance condition can be an outage condition. In such embodiments, the performance of the first cell is less than an outage threshold and the first cell is considered to be inoperable. In some embodiments and as described in further detail herein, an absence of power, an indication of low throughput, an indication that a backhaul link is down and/or the like can be used to determine and/or identify an outage condition.

In other embodiments, the underperformance condition can be a low performance condition. In such embodiments, the performance of the first cell is less than a performance threshold, but greater than an outage threshold. In some embodiments and as described in further detail herein, configuration parameters, Key Performance Indicators (KPIs) and/or the like can be used to determine and/or identify a low performance condition.

In some embodiments, the detector module can be configured to detect the underperformance condition (e.g., outage condition and/or low performance condition) within the first cell by calculating a metric value using a first indicator from the set of indicators and a second indicator from the set of indicators. The first indicator can have a weight greater than a weight of the second indicator. In other embodiments, the detector module can be configured to detect the underperformance condition within the first cell by calculating a metric using a single indicator or more than two indicators.

The adjustment module can be operatively coupled to the detector module. The adjustment module can be configured to iteratively adjust, during the time period, at least one parameter associated with a second cell from the set of cells to produce at least one adjusted parameter, where the second cell is within operative proximity to the first cell. The adjustment module can be configured to send the at least one adjusted parameter to the wireless network to improve performance of at least a portion of the wireless network during the time period. In some embodiments, the adjustment module can be configured to select the second cell from the set of cells based on at least one of (1) a distance between the first cell and the second cell, (2) a number of call handovers between the first cell and the second cell before the time period, or (3) a location and azimuth of the first cell and a location and azimuth of the second cell. In some embodiments, the at least one parameter associated with the second cell can be at least one of a tilt value of an antenna associated with the second cell or a power value transmitted by the antenna associated with the second cell.

In some embodiments, the apparatus can include a critical zone module operatively coupled to the adjustment module. The critical zone module can be configured to define a critical zone including the first cell and a group of cells from the set of cells within operative proximity (e.g., direct neighbor cells, neighbor of neighbor cells, etc.) of the first cell. In such embodiments, the adjustment module can be configured to iteratively adjust, during the time period, the at least one parameter associated with the second cell to improve performance of the critical zone.

The adjustment module can be configured to restore, after the time period, the at least one parameter associated with the second cell to a value equal to a value for the at least one parameter prior to the time period. In some embodiments, the adjustment module can be configured to store, in a memory, the value for the at least one parameter prior to the time period in response to the detector module detecting the underperformance condition within the first cell. The adjustment module can be further configured to send the value of the at least one parameter associated with the second cell to the wireless network. In some embodiments, the adjustment module can be configured to restore the at least one parameter in response to at least one of (1) the detector module detecting that the first cell does not include an underperformance condition, (2) the adjustment module determining that additional adjustments to the at least one parameter is not allowed, or (3) the adjustment module determining that an adjustment number threshold has been crossed (e.g., a number of times adjusted exceeds a predetermined threshold).

In some embodiments, the detector module can be configured to detect an underperformance condition (e.g., an outage condition and/or a low performance condition) within a third cell from the set of cells based on the set of indicators. The critical zone module can be configured to define, based on the third cell being within operative proximity to the first cell, a critical zone including the first cell, the third cell, a group of cells from the set of cells within operative proximity of the first cell, and a group of cells from the set of cells within operative proximity of the third cell (e.g., direct neighbor cells, neighbor of neighbor cells, etc.).

In some embodiments, the critical zone module can be configured to define, based on the third cell not being within operative proximity to the first cell. A first critical zone includes the first cell and a group of cells from the set of cells within operative proximity of the first cell. A second critical zone includes the third cell and a group of cells from the set of cells within operatively proximity of the third cell. In some embodiments, the adjustment module can be configured to improve performance of the first critical zone prior to improving performance of the second critical zone based on a performance of the first critical zone being worse than a performance of the second critical zone. In some other embodiments, the adjustment module can be configured to improve performance of the first critical zone during a first time period, and configured to improve performance of the second critical zone during a second time period at least partially overlapping the first time period.

As used herein, a module can be, for example, any assembly and/or set of operatively-coupled electrical components, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "a network optimization device" is intended to mean a single physical device or a combination of physical devices.

FIG. 1 is a schematic diagram that illustrates a network optimization device 100 coupled to a wireless network 150, according to an embodiment. The wireless network 150 can be any network that enables wireless communication devices (e.g., cellular phones, Wi-Fi enabled laptops, Bluetooth devices, mobile devices) to communicate with each other. In some embodiments, the wireless network 150 can be implemented and administered using a wireless transmission system such as radio frequency (RF) waves. For example, the wireless network 150 can be a cellular network that enables two cellular phones to communicate with each other. For another example, the wireless network 150 can be a Wi-Fi network that enables two Wi-Fi enabled laptops to be operatively connected. In some embodiments, the wireless network 150 can be at least a portion of, for example, a wireless local area network (WLAN), a wireless mesh network, a wireless metropolitan area network (MAN), a wireless wide area network (WAN), a mobile device network (e.g., a global system for mobile communications (GSM) network, a personal communications service (PCS) network), a radio access network (RAN), a long term evolution (LTE) network, a Universal Mobile Telecommunications System (UMTS) network and/or the like. In some embodiments, the network can include the connections between multiple base stations (i.e., the backhaul).

In some embodiments, the wireless network 150 can include multiple cells, such as the cells 151-156 as shown in FIG. 1. Each cell 151-156 can include one or more devices that can be wirelessly coupled to and communicate with one or more wireless communication devices within (or operatively within) that cell. The devices included in each cell 151-156 can be operatively coupled to each other via, for example, a wired network. As a result, the wireless communication devices within a cell 151-156 can be configured to communicate with other wireless communication devices within the same cell 151-156 or a different cell 151-156 using the devices included in the cells 151-156 as relays. In some embodiments, each cell 151-156 can include, for example, a base station equipped with one or multiple antennas.

For example, a first cellular phone operatively within the cell 151 can be operatively coupled to and configured to send a signal to a base station of the cell 151. The data contained in the signal can be destined to a second cellular phone that is operatively within the cell 155. The base station of the cell 151 can be configured to transmit the data associated with the signal to a base station of the cell 155 via any suitable network (e.g., the public switched telephone network (PSTN), an internet protocol (IP) network, etc.; not shown in FIG. 1) that operatively couples the base stations of the cells 151-156. The base station of the cell 155 can then be configured to send a signal containing the data to the second cellular phone. Thus, a connection between the first cellular phone and the second cellular phone can be established using the base station of the cell 151 and the base station of the cell 155 as relays.

In some embodiments, when an underperformance condition such as an outage condition or a low performance condition occurs to a device associated with a cell 151-156, the device might fail to communicate with the wireless communication devices within that cell. In such embodiments, that cell 151-156 can be identified as an underperforming cell. In some embodiments, an underperforming cell can further be classified as an outage cell or a low performance cell. In some embodiments, outage cells, low performance cells and/or their neighbor cells can be grouped into independent critical zones of cells. In some embodiments, a first cell within an operative proximity of a second cell can be identified as a neighbor of the second cell, such that changes in the configuration of the first cell can potentially have a significant impact on the performance of the second cell. As a result, the critical zones can be determined in a way such that configuration modifications in different critical zones will have negligible effect on the other critical zones.

In some embodiments, for example, the critical zone can be defined to include cells a predetermined distance away and/or number of cells removed (e.g., an $n^{th}$ level neighbor) from an underperforming cell. In such embodiments, changes made to optimize the underperforming cell can have an effect on the other cells in the critical zone but will have a negligible effect on the cells outside the critical zone. Thus, the cells within the critical zone can be said to be in operative proximity to the underperforming cell.

In some embodiments, if two underperforming cells (e.g., two outage cells) are neighbors of each other, then a critical zone can be defined to include both of the underperforming cells plus a portion or all of their neighbors and/or neighbors of their neighbors, etc., up to a predefined $n^{th}$ level neighbor. If the two underperforming cells are far from each other (i.e., not a neighbor of each other), a separate critical zone can be defined for each underperforming cell unless they share any neighbors and/or neighbors of their neighbors, etc., up to a predefined $n^{th}$ level neighbor. In the example of FIG. 1, for example, the cells 152, 153, 154 and 156 can be outage cells and/or low performance cells. The cells 152 and 153 can be neighbors to each other, the cells 154 and 156 can be neighbors to each other, and the cells 152, 153 can be far from (i.e., not a neighbor of) the cells 154, 156. Thus, a critical zone 141 can be defined to include the cells 152, 153 and their neighbor cell 151, and another critical zone 142 can be defined to include the cells 154, 156 and their neighbor cell 155. Details of underperforming cells (including outage cells and low performance cells) and critical zones are further described with respect to FIG. 2.

The network optimization device 100 can be any device configured to optimize or improve the performance of the wireless network 150 by modifying configurations of the devices (e.g., base stations) within the wireless network 150. In some embodiments, the network optimization device 100 can be, for example, a computer device, a server device, an application server, a mobile device, a workstation, and/or the like. The network optimization device 100 can be directly or operatively coupled to the devices within the wireless network 150. In some embodiments, the network optimization device 100 can be operatively coupled to devices within a cell 151-156 via one or multiple intermediate modules and/or devices such as, for example, a controller device and/or the like. In some embodiments, the network optimization device 100 can be coupled to devices of the wireless network 150 via any suitable connecting mechanism such as, for example, optical connections (e.g., optical cables and optical connectors), electrical connections (e.g., electrical cables and electrical connectors), wireless connections (e.g., wireless transceivers and antennas), and/or the like. While shown in FIG. 1 as a single device, in some embodiments the functionality of the network optimization device 100 can be distributed to multiple devices across the wireless network 150.

In some embodiments, the network optimization device 100 can be configured to execute an optimization process or method to optimize the performance of the wireless network 150. In some embodiments, such an optimization process or method can be executed to improve the performance of the wireless network 150 from, for example, a suboptimal performance Specifically, the network optimization device 100 can be configured to monitor the wireless network 150 and collect or receive power indications, link connection information, throughput indication, configuration parameters and/or Key Performance Indicators (KPIs) from the wireless network 150. Based on the collected or received data, the network optimization device 100 can be configured to detect outage and/or low-performing cells in the wireless network 150, and then group the detected outage and/or low-performing cells into one or multiple critical zones. The network optimization device 100 can then be configured to send configuration modifications to devices associated with the cells that are within the same critical zones as the outage and/or underperforming cells. The configuration modifications can then be applied at the corresponding devices. The optimization process is further described in details with respect to FIGS. 3-6.

In some embodiments, outage cells and low-performing cells can be grouped into separate critical zones. In such embodiments, the network optimization device can detect outage cells and define a first set of critical zones based on the outage cells. The network optimization device can similarly detect low-performing cells and define a second set of critical zones based on the low-performing cells. In such embodiments, while the two sets of critical zones can overlap, they are optimized separately. For example, the first set of critical zones (i.e., the outage critical zones) can be optimized prior to optimizing the second set of critical zones (i.e., the low performance critical zones). In other embodiments, a single set of critical zones can be defined for both the outage cells and the low-performing cells. In such embodiments, the set of critical zones can be optimized taking into account both the outage cells and the low-performing cells.

Figure 2:
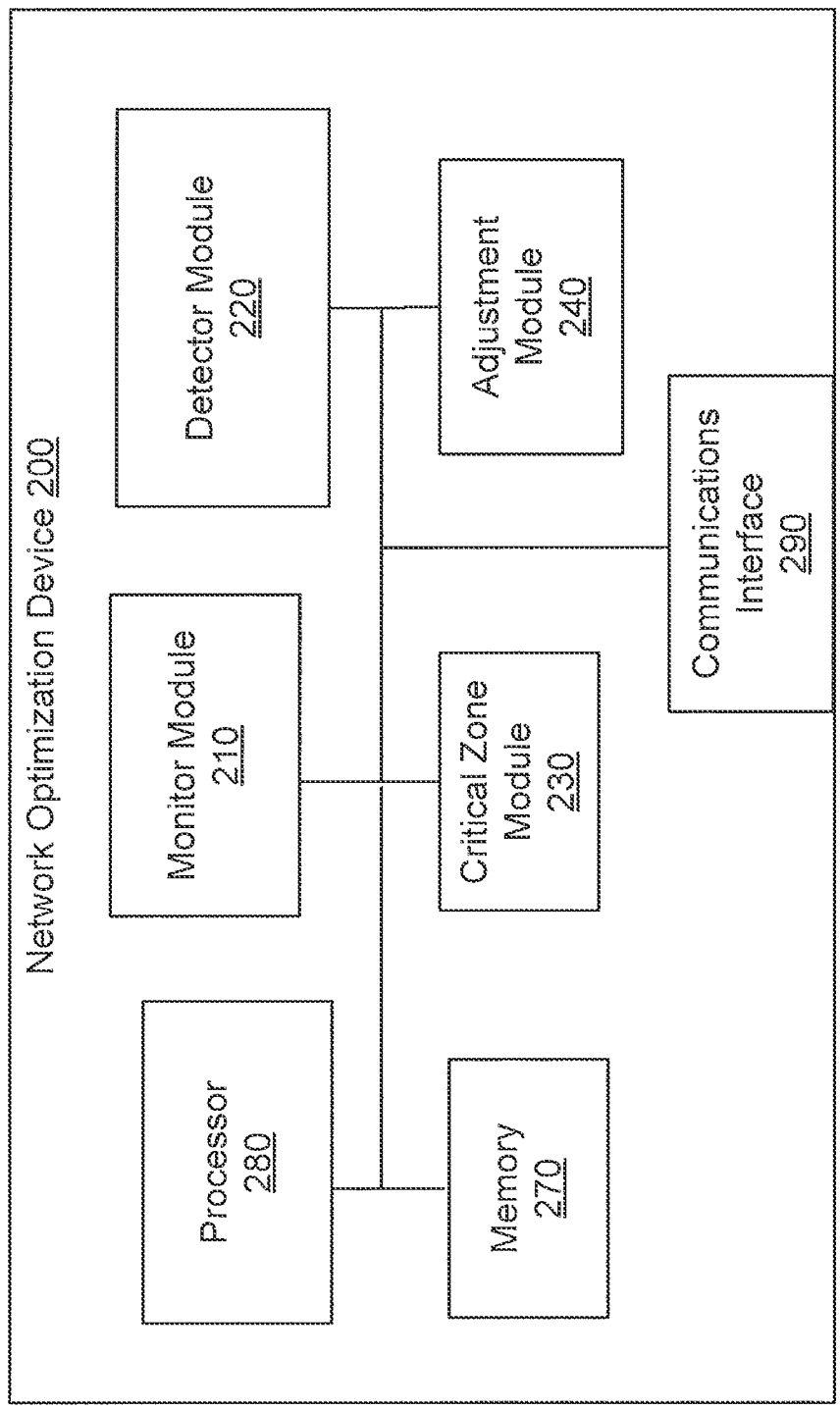
FIG. 2 is a system block diagram of a network optimization device, according to an embodiment.

FIG. 2 is a system block diagram of a network optimization device 200, according to an embodiment. The network optimization device 200 can be structurally and functionally similar to the network optimization device 100 shown and described with respect to FIG. 1. The network optimization device 200 can be coupled to a wireless network (not shown in FIG. 2) that is similar to the wireless network 150 shown and described with respect to FIG. 1. As shown in FIG. 2, the network optimization device 200 can include a processor 280, a memory 270, a communications interface 290, a monitor module 210, a detector module 220, a critical zone module 230, and an adjustment module 240. In some embodiments, the network optimization device 200 can be a single physical device. In other embodiments, the network optimization device 200 can include multiple physical devices, each of which can include one or multiple modules and/or components shown in FIG. 2.

Each module or component in the network optimization device 200 can be operatively coupled to each remaining module or component. Each module in the network optimization device 200 can be any combination of hardware and/or software (stored and/or executing in hardware) capable of performing one or more specific functions associated with that module. In some embodiments, each module in the network optimization device 200 can include, for example, a field-programmable gate array (FPGA), an application specific integrated circuit (ASIC), a digital signal processor (DSP), and/or the like.

The memory 270 can be, for example, a random-access memory (RAM) (e.g., a dynamic RAM, a static RAM), a flash memory, a removable memory, and/or so forth. In some embodiments, the memory 270 can include, for example, a database, process, application, algorithm, virtual machine, and/or some other software modules (stored and/or executing in hardware) or hardware modules configured to execute the optimization process and/or one or more associated methods for optimizing or improving the performance of the wireless network (e.g., via the communications interface 290). In such embodiments, instructions of executing the optimization process and/or the associated methods can be stored within the memory 270 and executed at the processor 280.

The communications interface 290 can include and be configured to manage one or multiple ports of the network optimization device 200. In some embodiments, for example, the communications interface 290 can include one or more line cards, each of which can include one or more ports (operatively) coupled to devices (e.g., base stations) in the wireless network. A port included in the communications interface 290 can be any entity that can actively communicate with a coupled device or over a network. In some embodiments, such a port need not necessarily be a hardware port, but can be a virtual port or a port defined by software. In some embodiments, the connections between the communications interface 290 and the devices in the wireless network can implement a physical layer using, for example, fiber-optic signaling, electrical cables, wireless connections, or other suitable connection means. In some embodiments, the communications interface 290 can be configured to, among other functions, receive data and/or information collected or received from the wireless network, and send configuration modifications, commands, and/or instructions to the devices in the wireless network.

The processor 280 can be configured to control, for example, the operations of the communications interface 290, write data into and read data from the memory 270, and execute the instructions stored within the memory 270. The processor 280 can also be configured to control, for example, the operations of the monitor module 210, the detector module 220, the critical zone module 230, and the adjustment module 240. In some embodiments, under the control of the processor 280 and based on the methods or processes stored within the memory 270, the monitor module 210, the detector module 220, the critical zone module 230, and the adjustment module 240 can be configured to collectively execute an optimization process to optimize or improve the performance of the wireless network, as described in further detail herein.

The monitor module 210 can be configured to monitor the performance of the wireless network. Specifically, the monitor module 210 can be configured to collect or receive data and/or information from the cells of the wireless network. In some embodiments, the monitor module 210 can be configured to collect or receive observation data from one or multiple wireless communication devices (e.g., cellular phones) that communicate with a base station of a cell. In such embodiments, the observation data can be measured, received and/or collected based on, for example, the signals that are received from the base station at the wireless communication devices, or the signals that are sent from the wireless communication devices to the base station. In some other embodiments, the monitor module 210 can be configured to collect or receive observation data from the base station of the cell. Additionally, in some embodiments, data can be collected or received from the base stations and/or wireless communication devices in the wireless network periodically in observation windows. Such an observation window can be, for example, one hour.

In some embodiments, data collected or received at the monitor module 210 can include a set of indicators that can be used to determine the performance of the wireless network. The set of indicators can include, for example, a performance indicator, a mobile level measurement, a network configuration parameter, and/or an indication of a network alarm. In some embodiments, the indicators can include site-related configuration parameters, network-related configuration parameters, sector-related configuration parameters, RF-carrier-related configuration parameters, power indicators, throughput indicators, and/or various KPIs.

The site-related configuration parameters (configuration parameters per site) can include, for example, name of the site, longitude, latitude and altitude of the site, etc. The sector-related configuration parameters (configuration parameters per sector) can include, for example, site name, sector name, active/inactive, frequency band, number of carriers for the sector, service for each carrier, height above the site ground level, antenna gain (e.g., in dBi), mechanical downtilt, electrical downtilt, total sector power (e.g., in dBm), etc. The RF-carrier-related configuration parameters (configuration parameters per RF carrier) can include, for example, site name, sector name, carrier number, carrier RF frequency, PN (pilot number) offset, active set threshold (e.g., in dB), maximum available power for the carrier (e.g., in dBm), pilot power (e.g., in dBm), synchro power (e.g., in dBm), paging power (e.g., in dBm), etc.

The KPIs can include, for example, carrier, site, sector, cell, and/or mobile level KPIs. The KPIs can include, for example, a transmitted radio power level value of a cell, an SCR value of a cell, traffic statistical values associated with a cell, handover statistical values associated with a cell, a DCR value associated with a cell, and/or the like. Specifically, the carrier level KPIs can include, for example, year/month/day/time, site name, sector name, carrier number, total average transmitted power (e.g., in dBm), uplink total noise (e.g., in dBm), downlink/uplink load factor (e.g., in percentage), uplink interference noise rise (e.g., in dB), number of downlink/uplink radio links used, connection success rate (e.g., in percentage), average number of attempted users, average number of connected users, average number of used codes, ratio of handoff (e.g., in percentage), connection success, downlink/uplink throughput (e.g., in kbps), etc.

The detector module 220 can be configured to detect under-performing cells (e.g., outage cells and/or low-performing cells) in the wireless network. Specifically, the detector module 220 can be configured to receive the observation data (e.g., indicators) collected or received at the monitor module 210. Based on the received observation data, the detector module 220 can be configured to detect the outage cells and/or low-performing cells that demonstrate degraded performance in certain performance criteria.

In some embodiments, one or more performance metrics can be used to characterize the performance of the cells in the wireless network. Such performance metrics can include, for example, SCR (e.g., averaged over an observation window within a critical zone or a cell), dropped call rate (DCR), capacity (e.g., throughput of, for example, a critical zone or a cell), capacity increase ratio (e.g., change in the throughput of, for example, a critical zone or a cell relative to the initial traffic associated with that critical zone or cell), the power supplied to a base station, and/or the like.

In some embodiments, the detector module 220 can be configured to monitor the performance of the wireless network in terms of the frequency of negative or degraded performance incidents. For example, the detector module 220 can be configured to, based on the received data from the monitor module 210, detect cells that have repeated incidents of degraded performance (e.g., low SCR).

In some embodiments, the underperforming cell(s) that are detected at the detector module 220 can be included in one or more lists of underperforming cells. Such lists of underperforming cells can then be provided to the critical zone module 230, such that the underperforming cells can be grouped into and defined within critical zone(s) at the critical zone module 230. In some embodiments, outage cells and low-performing cells can be included in two separate lists such that two sets of critical zones are defined. In other embodiments, outage cells and low-performing cells can be included in a single list such that a single set of critical zones is defined to include the outage cells and the low-performing cells.

Figure 3:
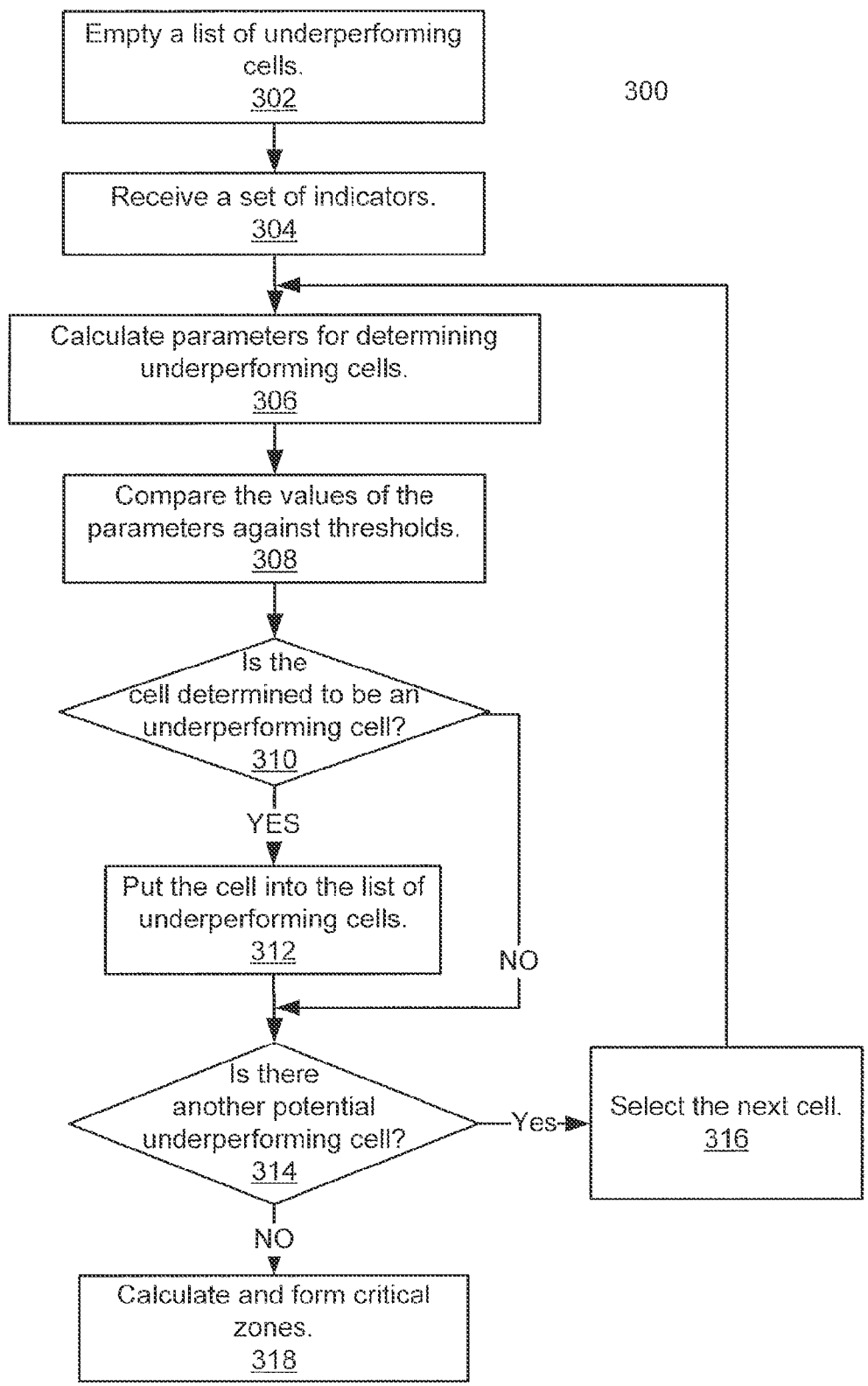
FIG. 3 is a flow chart illustrating a method for detecting underperforming cells in a wireless network, according to an embodiment.

FIG. 3 is a flow chart illustrating a method 300 for detecting underperforming cells (e.g., outage cells and/or low performance cells) in a wireless network, according to an embodiment. The detecting process can be executed at, for example, a detector module of a network optimization device, such as the detector module 220 of the network optimization device 200 shown and described with respect to FIG. 2. The network optimization device can be operatively coupled to the cells of the wireless network. Thus, the network optimization device can be configured to monitor and control the wireless network.

At 302, when the detecting process is initialized, a list of underperforming cells (e.g., outage cells and/or low-performing cells) can be emptied. The list of underperforming cells can be associated with the wireless network. In some embodiments, the list of underperforming cells can be emptied when the detecting process is executed for the first time. In some embodiments, the list of underperforming cells can be emptied based on, for example, a command from a user that operates the network optimization device.

At 304, a set of indicators can be received or collected from, for example, a monitor module of the network optimization device (e.g., the monitor module 210 of the network optimization device 200 in FIG. 2) and sent to the detector module. The set of indicators can include data collected or received from wireless communication devices and/or base stations within the wireless network that can be used to identify an underperforming situation at a cell. In some embodiments, as described above, the received or collected indicators can include, for example, carrier, site, sector, cell, and/or mobile level KPIs associated with the cells in the wireless network. In some embodiments, the indicators received or collected from the monitor module can be collected or received over, for example, the period of one complete observation window (e.g., one hour). In such embodiments, the KPIs associated with the cells can be collected or received over the period of one complete observation window and provided in advance to the network optimization device.

At 306, parameters for determining the underperforming cells can be calculated for a cell. In some embodiments, a series of parameters can be calculated for the cell based on the received or collected indicators associated with that cell. In some embodiments, the actual transmitted radio power level, the actual downlink received power level, a throughput level, a backhaul link down indicator and/or alarm conditions or signals can be used to determine outage cells. In some embodiments, the alarm condition or signal can be configured, for example, as per an operator's needs. In such embodiments, the actual transmitted radio power level, the actual downlink received power level, the throughput level, the backhaul link down indicator and/or the alarm conditions or signals can be configured to directly and/or substantially immediately trigger an outage condition.

In detecting low performance cells and/or outage cells, in some embodiments, an SCR can be calculated for each hour for each service (e.g., a voice service, a high-speed downlink packet access (HSDPA) service) in the cell. In such embodiments, if an SCR associated with an hour and a service is less than a predetermined threshold, the cell can be determined to have one critical event at that hour for that service. In some other embodiments, the detector module can be configured to identify a low performance situation or an outage situation associated with a cell based on other types of indicators collected or received from the wireless network. For example, the detector module can be configured to deduce a low performance situation or an outage situation by monitoring traffic patterns (e.g., voice and/or data) of the cell. In this case, the monitor module can be configured to monitor the traffic in the cell within a user-specified period of time, such as certain hours in a given number of days. The traffic history of the cell can be estimated and then compared against the actual traffic to identify an outage situation. For another example, the detector module can be configured to deduce a low performance situation or an outage situation at a cell based on handover statistics (e.g., voice and/or data), traffic statistics (e.g., voice and/or data), and/or DCR statistics (e.g., voice and/or data) associated with the cell and neighbors of the cell.

In some embodiments, the detector module can be configured to determine underperforming cells based on a certain indicator only (e.g., KPI). In some other embodiments, the detector module can be configured to determine underperforming cells based on a combination of multiple indicators. In such embodiments, the combination of the indicators can be configured, for example, as per the operator's needs. Furthermore, the multiple indicators can be weighted to generate an overall performance value for a cell. For example, weights can be assigned to the critical events based on the service type, where the most basic service has the highest weight, and vice versa (e.g., the weight for the voice service is 3, and the weight for the HSDPA service is 1). The weighted numbers of critical events for the cell can be further averaged for each hour over the period of the observation window (e.g., five days), which can yield 24 average values for the cell.

At 308, the values of the parameters can be compared against predetermined thresholds. In the previous example, the averaged values of critical events for the cell can be compared against a predetermined threshold value (e.g., a predetermined threshold value of 4 if the weight for the voice service is 3 and the weight for the HSDPA service is 1). In some embodiments, for example, any suitable logical combination of parameters can be logically combined and the result compared to the threshold. As a result, the hours with average values exceeding the predetermined threshold value can be marked as potential critical hours for the cell. If the cell has at least one potential critical hour, the cell can be put into a list of potential underperforming cells, and the potential critical hour(s) associated the cell can be included in a list of potential critical hours.

At 310, it can be determined whether the cell is an underperforming cell based on the result of the comparisons conducted at 308. In the previous example, each of the potential critical hour(s) associated with the cell can be checked based on, for example, KPI values associated with the cell to determine whether it is a true critical hour. Specifically, the available resources of the cell at its potential critical hour(s) can be calculated based on the KPI values. The resources to be checked for availability can include, for example, number of available channel elements, transmit power margin, pilot power margin, number of available orthogonal variable spreading factor (OVSF) codes, and/or the like. In some embodiments, the decision about the availability of resources can be made based on the most limited resource. If it is determined that there are not enough available resources during a potential critical hour, the potential critical hour can be confirmed as critical for the cell due to congestion. Thus, the potential critical hour can be marked as a critical hour for the cell. Otherwise, if it is determined that there are enough available resources during a potential critical hour, it can conclude that the critical situation during that hour is not caused by congestion. Thus, the potential critical hour can be removed from the list of potential critical hours for the cell.

After all potential critical hour(s) for the cell are checked, the cell can be determined to be an underperforming cell or not. Specifically, if all potential critical hour(s) are removed from the list of potential critical hours and no critical hour is marked, the cell can be confirmed to have no critical hour with high congestion. As a result, the cell can be removed from the list of potential underperforming cells. Otherwise, if at least one potential critical hour is marked as a critical hour, the cell can be confirmed to have at least one critical hour with high congestion. As a result, the cell can be marked as an underperforming cell (e.g., low-performing cell or outage cell).

In other embodiments, and as described above, an outage condition can be configured to be directly and/or substantially immediately identified based on the actual transmitted radio power level, the actual downlink received power level, a throughput level, a backhaul link down indicator and/or alarm conditions or signals. In such embodiments, critical hours are not used. For example, if the detector module determines that a base station associated with a cell is not receiving power, an outage condition can be substantially immediately identified.

At 312, if the cell is determined as an underperforming cell, that cell can be put into the list of underperforming cells cells. Otherwise, that cell is not included in the list of underperforming cells. As discussed above, in some embodiments, a list of low-performing cells is maintained separately from a list of outage cells. In other embodiments, a single list including both low-performing cells and outage cells can be maintained.

At 314, it can be determined whether any other potential underperforming cell exists. That is, it can be determined whether any cell has not been investigated. At 316, if at least one potential underperforming cell exists (i.e., at least a cell has not been investigated), the next potential underperforming cell can be selected and the detecting process can be repeated for that cell starting at 306. At 318, if no potential underperforming cell exists (i.e., all cells have been investigated), the list of underperforming cells can be finalized. If any cell is determined to be an underperforming cell (i.e., included in the list of underperforming cells), the list of underperforming cells can be sent to, for example, a critical zone module of the network optimization device (e.g., the critical zone module 230 of the network optimization device 200 in FIG. 2). As a result, the critical zone module can be configured to calculate and define critical zones based on the list of underperforming cells, as described in further detail herein. As described in further detail herein, critical zones can be used to improve underperforming cells. In some embodiments, such improvement can include load balancing between cells, adjusting the performance of a low-performing cell, compensating for an outage cell, and/or the like.

A new cycle of the detecting process can start, for example, from step 304 over a next period of a complete observation window. In the following cycle(s), the detector module and/or other modules of the network optimization device can be configured to take necessary actions to avoid having ping-pong situations, where the configurations (e.g., antenna configurations) applied in the wireless network are changed back and forth due to, for example, conflicting changes dictated by different critical hours of the same underperforming cell or by different closely located underperforming cells. Such ping-pong situations can be within an underperforming cell or within a cell within operative proximity of (e.g., within a same critical zone as) the underperforming cell. In some embodiments, for example, if a cell parameter modified in a first cycle is changed back to its configuration prior to the first cycle in the second cycle, the network optimization device can be configured to prevent the cell parameter from being modified in a third cycle.

Returning to FIG. 2, the critical zone module 230 can be configured to define critical zones for the detected underperforming cells. Specifically, in response to receiving the list of underperforming cells from the detector module 220, the critical zone module 230 can be configured to group the underperforming cells and/or their neighbor cells into one or multiple critical zones of cells. In some embodiments, as described with respect to FIG. 1, the critical zones can be determined or defined in such a way that configuration modifications in different critical zones will have negligible effect on each other.

In some embodiments, to define critical zones based on underperforming cells, local zones can be first identified. In such embodiments, for each underperforming cell, a local zone can be identified as the set of the neighbor cells of that underperforming cell based on some criteria such as one or more performance metrics. For example, the identification of a local zone can be based on the DCR for the corresponding neighbor cells having exceeded a certain DCR threshold over a certain window of time (e.g., an observation window). The performance metric can also be calculated across specific time slots in different time frames, such as, Mondays to Fridays, Mondays only or Mondays to Fridays morning hours.

The local zone can contain the underperforming cell, the direct neighbors of the underperforming cell, the neighbors of the direct neighbors, and/or additional levels of neighbors. For each group of overlapped local zones, critical zones can be identified as the union of these overlapped zones. In some embodiments, the critical zones do not include overlapping zones. In some embodiments, such a zone identification process can be executed continuously at the critical zone module 230 to identify new critical zones to be optimized or improved.

In some embodiments, the critical zone module 230 can be configured to rank the critical zones by, for example, the severity of the performance problem. Thus, the most problematic critical zone can be chosen, and adjustments and/or other optimization operations (as described below) can be executed to resolve the problem of that specific critical zone. In some embodiments, the network optimization device 200 can be configured to give the user the option of determining the order in which critical zones will be optimized or improved. In some embodiments, based on the available computing resource in the optimization system (e.g., the network optimization device 200) as well as the rank of the critical zones, one or more of the critical zones can be chosen for optimization or improvement in serial, parallel or both.

In some embodiments, the critical zone module 230 can be configured to iteratively define critical zones for each observation window. In some embodiments, if an overlap exists between a newly formed critical zone and an existing critical zone in terms of the cells that they contain, then configuration modifications will not be calculated based on the new critical zone until the process of applying configuration modifications for the existing critical zone are completed.

After the critical zone module 230 identifies a critical zone including one or multiple underperforming cells, the adjustment module 240 can be configured to solve the problem in the critical zone by adjusting the underperforming cell(s)' neighbor cell(s). Specifically, the adjustment module 240 can be configured to calculate and send configuration modifications to the corresponding neighbor cell(s) of the underperforming cell(s) in the critical zone. As a result, the configuration modifications can be applied at the neighbor cell(s). In some embodiments, the underperforming cell can be adjusted instead of or in addition to its neighbor cell(s). In the case of a low-performing cell, for example, any suitable parameter (e.g., antenna tilt) can be adjusted to improve performance within the low-performing cell. In the case of an outage cell, for example, power can be turned off to the antenna associated with the outage cell.

In some embodiments, the monitor module 210, the detector module 220, the critical zone module 230, and the adjustment module 240 can be configured to collectively execute an automated network optimization method or process for the wireless network. In some embodiments, such an automated network optimization method or process can be referred to as a self-healing method or process.

As described above, in some embodiments, the network optimization device 200 can detect and optimize outage cells concurrently with detecting and optimizing low-performing cells. In other embodiments, the processes can be separate such that the network optimization device 200 can optimize outage cells prior or subsequent to optimizing low-performing cells. In some embodiments, cycles to optimize outage cells and cycles to optimize low-performing cells can alternate.

Figure 4:
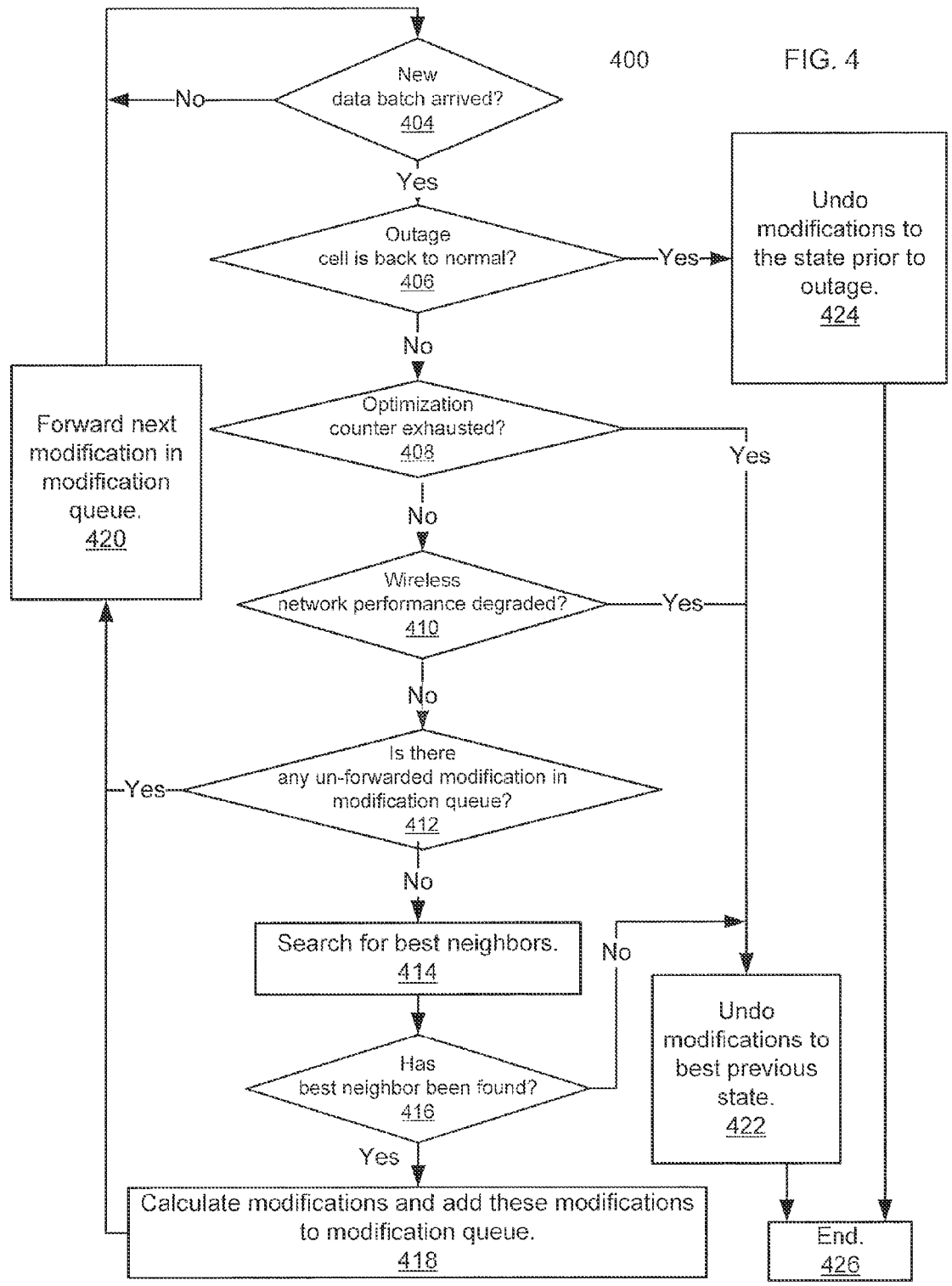
FIG. 4 is a flow chart illustrating a self-healing method, according to an embodiment.

FIG. 4 is a flow chart illustrating a self-healing method or process, according to an embodiment. The self-healing optimization method 400 described in FIG. 4 can be executed at, for example, a network optimization device such as the network optimization device 200 shown and described with respect to FIG. 2. The network optimization device can include, for example, a monitor module, a detector module, a critical zone module, and an adjustment module, which are similar to the modules of the network optimization device 200 shown and described with respect to FIG. 2. Furthermore, the network optimization device can be operatively coupled to a wireless network that is similar to the wireless network 150 shown and described with respect to FIG. 1.

At 404, it can be determined whether a new data batch has arrived to the network optimization device. In some embodiments, the monitor module can be configured to monitor the performance of the wireless network by collecting or receiving, for example, KPI values from the wireless network and providing the collected or received KPI values to the network optimization device. In some embodiments, the collected or received KPI values can be provided in, for example, hourly data batches, which allows near real time monitoring for the performance of the wireless network. In some embodiments, as described with respect to FIG. 3, such a monitoring operation can be conducted for one or more weighted performance metrics.

At 406, it can be determined whether the performance of an outage cell is back to normal. The outage cell can be identified in a previous iteration of the optimization process. As a result of the previous iteration of the optimization process, configuration modifications associated with the outage cell can be sent to and applied in the wireless network. In each iteration of the optimization process, the detector module can be configured to determine whether the performance of each outage cell identified in previous iterations has been changed back to normal. In some embodiment, the detector module can be configured to detect, based on the received data batches, any major problem that occurred after recommended configuration modifications associated with the outage cell have been implemented in the wireless network.

If it is determined that the performance of the outage cell has been changed back to normal at 406, the configuration modifications associated with that outage cell that has been implemented in the wireless network can be undone at 424, such that the configuration of the corresponding cells (e.g., neighbor cells of the outage cell) can be reverted to the state before the outage occurred.

Otherwise, if it is determined that the performance of the outage cell has not been changed back to normal at 406, it can be determined at 408 whether an optimization counter has been exhausted. In some embodiments, the optimization counter can be used to limit the execution of recommended configuration modifications associated with the specific outage cell. Such an optimization counter can serve as a limitation on, for example, the number of executions of certain configuration modifications, the extent of a certain configuration modification, and/or any other aspect of execution of the configuration modifications. For example, the optimization counter associated with the outage cell can serve as a limit on tilt for antennas of neighbor cells of the outage cell. Thus, if the optimization counter is set to 4, the maximum possible tilt for neighbor cells of the outage cells is limited at 4.

If it is determined that the optimization counter has been exhausted at 408, the configuration modifications associated with the outage cell that were previously implemented in the wireless network can be undone at 422, such that the configuration of the corresponding cells (e.g., neighbor cells of the outage cell) can be reverted to a previous configuration that has been recorded. In some embodiments, performance values, as well as configurations that yield the performance values, can be recorded after each configuration modification is applied at the wireless network. In some embodiments, the performance values and the corresponding configurations can be stored in, for example, a memory (e.g., the memory 270 in FIG. 2) of the network optimization device. Thus, at 422, the adjustment module can be configured to evaluate the list of performance values recorded after each previous configuration modification, and then revert the configuration of the corresponding cells to the status that yielded the best (or better) performance in the previous iterations.

Otherwise, if it is determined that the optimization counter has not been exhausted at 408, it can be determined at 410 whether the performance of the wireless network has been degraded. Thus, the performance change of the wireless network can be monitored such that configuration modifications leading to a degraded performance can be avoided.

In some embodiments, the performance of the wireless network, as a result of configuration modifications being applied in the wireless network during the optimization process, can be evaluated using certain performance metrics. For example, a critical zone average SCR in one observation window can be used as such a performance metric. The critical zone average SCR can be calculated as the number of successful calls in the critical zone over one observation window divided by the number of total captured calls in the critical zone over that observation window.

In some embodiments, the configuration modifications applied in the wireless network, especially those that change transmitter signal coverage, can have a harmful impact on the wireless network. In some embodiments, changes of the transmitter signal coverage at a target cell can result in, for example, considerable interference in that target cell and/or its neighbor cells. For example, for coverage extension purposes an antenna of a base station at the target cell can be uptilted until its beam is directed towards just below the horizon. Uptilting an antenna too much, however, can lead to overshooting. In that scenario, signals transmitted from the corresponding transmitter can significantly reduce the average Ec/Io values (the ratio of the signal energy (Ec) to the total noise and interference (Io)) observed by the mobile stations in different cells, which can result in considerable interference at the different cells.

In such an example, configuration modifications targeting transmitter coverage changes can be accompanied by, for example, an interference check over potentially affected cells. Specifically, after each configuration modification targeting at transmitter coverage change is applied, the monitor module can be configured to collect or receive measurements, which can indicate the interference imposed, from mobile stations (e.g., cellular phones) in the potentially affected cells. Thus, the aggregate interference power can be determined through these measurements. In some cases, these measurements can be aggregated in, for example, an interference matrix showing interference relations between different cells. In case of an increase is detected in the interference power, the corresponding configuration modifications can be stopped, and the configuration for the wireless network can be reverted to a previous configuration when the interference level on the interfered mobile stations is acceptable.

If it is determined that the performance of the wireless network has been degraded at 410, the configuration modifications associated with the outage cell that were previously implemented in the wireless network can be undone at 422, such that the configuration of the corresponding cells can be reverted to the status that yielded the best (or better) performance in the previous iterations. Otherwise, if it is determined that the performance of the wireless network has not been degraded at 410, it can further be determined at 412 whether any modification exists in a modification queue that has not yet been forwarded to the wireless network. The modification queue can be stored in, for example, a memory (e.g., the memory 270 in FIG. 2) within the optimization network device. In some embodiments, configuration modifications that have been calculated at the adjustment module can be added to the modification queue before being forwarded to and applied at the wireless network.

If it is determined that at least one un-forwarded modification exists in the modification queue at 412, the next modification in the modification queue can be forwarded to the wireless network at 420, and then applied at the corresponding cell(s). Otherwise, if it is determined that no un-forwarded modification exists in the modification queue at 412, best neighbors of the outage cell can searched at 414. Adjusting the neighbor cells of the outage cell should often reduce in reducing the failure of calls in the outage cell area and the self-healing algorithm can be able to transfer some of the outage cell's load to its neighbor cells. In some embodiments, a neighbor list of the outage cell can be used in the search for best neighbors of the outage cell. In such embodiments, the neighbor list can be made available to the network optimization device through, for example, a configuration table. In some embodiments, the best neighbors of the outage cell can be selected based on, for example, a distance between the outage cell and the neighbor cells, a number of call handovers between the outage cell and the neighbor cells, and a location and azimuth of the outage cell and a location and azimuth of each neighbor cell.

At 416, it can be determined whether the best neighbor for the outage cell has been found. If no best neighbor has been found for the outage cell at 416, the configuration modifications associated with the outage cell that were previously implemented in the wireless network can be undone at 422, such that the configuration of the corresponding cells can be reverted to the status that yielded the best (or better) performance in the previous iterations.

Otherwise, if at least a best neighbor has been found for the outage cell at 416, configuration modifications can be calculated for the best neighbor and these modifications can be added to the modification queue at 418. Specifically, the adjustment module can be configured to calculate the configuration modifications, which can be in the form of, for example, a small uptilt increase for the best neighbor's antenna, a small increase of radio power for the best neighbor cell, and/or the like. In some embodiments, the configuration modifications can include modifications on transmitter properties of the base stations associated with the best neighbor of the outage cell. The transmitter properties can include, for example, transmit power, antenna tilts, azimuth, beamwidth, etc. Such modifications can aim at modifying the coverage of the best neighbor of the outage cell. In some embodiments, the configuration modifications can be expected to enable part of the outage cell's previous traffic load to be served by the best neighbor cell, thus to enhance the performance of the wireless network.

At 420, the next modification in the modification queue can be forwarded to the wireless network, and then applied at the corresponding cell(s). In some embodiments, the configuration modifications suggested by the self-healing method or process can be applied to the wireless network all at once or they can be applied step-by-step. For example, the first modification can be applied to the wireless network immediately, then after verifying in the following observation window that performance of the wireless network has not been degraded, the next modifications can be applied. In some embodiments, this apply-and-observe technique can be very conservative and can prevent the self-healing method or process from causing harmful changes to the wireless network as the incremental modifications are not performed unless the effect of the previously applied modifications is observed and accepted. While the performance of the wireless network is being improved, such a self-healing optimization method 400 can be executed iteratively for every observation window.

In some embodiments, in case of multiple outage cells in a critical zone, one or multiple best neighbors can be determined for each outage cell. The configuration modifications for each outage cell as well as their corresponding best neighbors can be calculated. Next, multiple configuration modifications can be grouped and each modification group can include at most one modification corresponding to each outage cell. One group of configuration modifications can be applied to the wireless network at a time. In such embodiments, the self-healing method or process can suggest one configuration modification for each outage cell at a time, however, a total of more than one configuration modification for the critical zone with multiple outage cells can be implemented during the optimization process.

In some embodiments, after the configuration modifications are applied at the wireless network, the monitor module can be configured to continue monitoring the performance of the wireless network to ensure that the system performance is improving. Specifically, the monitor module can be configured to continue collecting or receiving observation data in form of data batches from the wireless network, as described with respect to step 404. In some embodiments, the monitor module can be configured to monitor the wireless network all the time as the self-healing method or process is running at the network optimization device.

At 426, after the configuration modifications associated with the outage cell that were previously implemented in the wireless network are undone for the wireless network, the self-healing optimization process can be terminated. In some embodiments, the network optimization device can be configured to terminate the self-healing method or process if, for example, at least one previous outage cell has recovered, or no improvement is expected from further iterations of the self-healing method or process. In the former case, the self-healing method or process can be terminated and then the configuration for the wireless network can be reverted back to the original configuration before the outage occurred. In the latter case, the self-healing method or process can be configured to search the best (or better) previous performance and then revert the configuration for the wireless network back to the corresponding configuration that yielded that best (or better) previous performance. In some embodiments, after the parameters associated with the best (or better) previous performance are implemented, the network optimization device can continue to optimize the wireless network. In such embodiments, for example, the network optimization device can remove the cell that was previously used as a best neighbor from possible future neighbor lists, empty the modification queue, and restart the method 400 to search for potential best neighbors.

Additionally, in some embodiments, the operation of the network optimization device can be controlled using multiple configurable parameters. Each of the configurable parameters can have a default value and be modified by, for example, an operator of the network optimization device. The configurable parameters can include, for example, PERFORMANCE_DEGRADATION_MARGIN (acceptable degradation in performance for the instantaneous observation window, e.g., "1.0"), TILT_INCREMENT (smallest change in TILT (in degrees), e.g., "1"), POWER_MODIFICATIONS_ENABLED (indicates whether the configuration modifications may involve changes in the transmitted power levels, e.g., "FALSE"), OBSERVATION_WINDOW_SIZE (duration of the observation window, e.g., "one hour"), and/or the like. In some embodiments, the configurable parameters for the network optimization device can be referred to as user controllable inputs.

In some embodiments, the network optimization device can be configured to execute an external-input driven optimization method or process. That is, configuration modifications can be received from an external source instead of being calculated within the network optimization device. In some embodiments, the configuration modifications can be manually input into the network optimization device by, for example, a network engineer, a network administrator, an operator, a user, and/or the like. In some embodiments, the configuration modifications can be calculated inputs from other methods or processes that are executed at other devices operatively coupled to the network optimization device.

In such an external-input driven mode of operation, the functionality of the network optimization device can include, for example, implementing the external configuration modifications in an iterative manner in large or small steps (or according to a scheduled sequence for a large number of configuration changes); monitoring the changes in the performance of the wireless network after each implementation of the external configuration modifications; stopping the process if a degradation in the performance is detected (e.g., based on KPIs, events, equations, etc.); and reverting back to a previous configuration at the end of the implementation if necessary.

Figure 5:
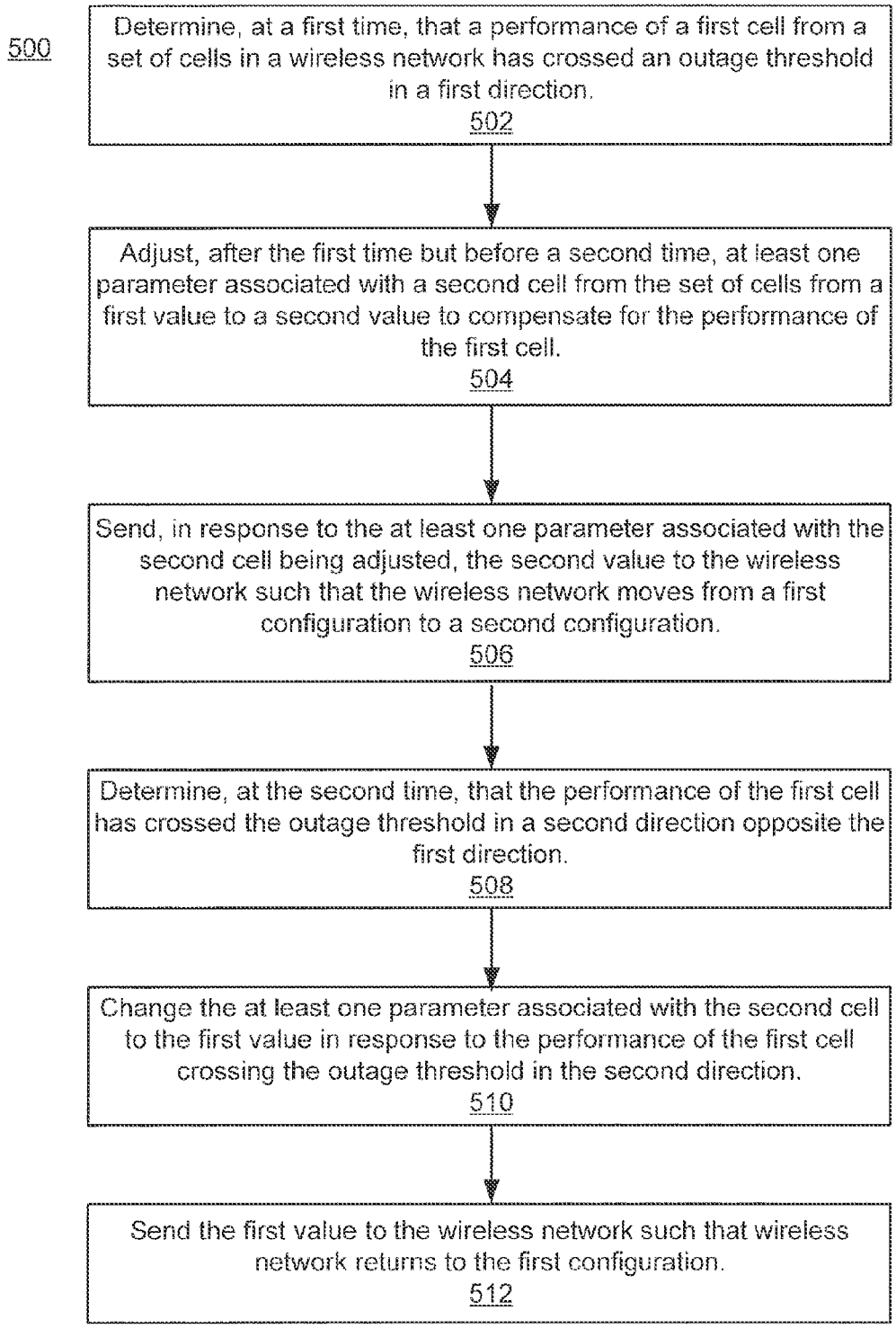
FIG. 5 is a flow chart illustrating an optimization method, according to an embodiment.

FIG. 5 is a flow chart illustrating an optimization process 500, according to an embodiment. The optimization process 500 is an example of an implementation of the methods described with respect to FIGS. 3 and 4, where a single outage cell can be detected and its performance can be optimized or improved. The optimization process 500 can be executed at, for example, a network optimization device such as the network optimization device 200 shown and described with respect to FIG. 2. The network optimization device can include, for example, a monitor module, a detector module, a critical zone module, and an adjustment module, which are similar to the modules of the network optimization device 200 shown and described with respect to FIG. 2. Furthermore, the network optimization device can be operatively coupled to a wireless network that is similar to the wireless network 150 shown and described with respect to FIG. 1.

At 502, it can be determined at a first time that a performance of a first cell from a set of cells in the wireless network has crossed an outage threshold in a first direction. The wireless network has a first configuration at the first time. In some embodiments, the first direction is a direction such that the performance of the first cell is degraded when it crosses the outage threshold in the first direction. In some embodiments, the performance of the first cell can be determined based on, for example, a set of KPIs associated with the cells in the wireless network, system alarms, and/or the like. The monitor module can be configured to collect or receive the KPIs from the cells of the wireless network before the first time. In some embodiments, the performance of the first cell can be associated with, for example, at least one of a transmitted radio power level value of the first cell, an SCR value of the first cell, traffic statistical values associated with the first cell, handover statistical values associated with the first cell, or a DCR value associated with the first cell.

At 504, at least one parameter associated with a second cell from the set of cells can be adjusted, after the first time but before a second time, from a first value to a second value to compensate for the performance of the first cell. In some embodiments, the second cell can be, for example, a best neighbor of the first cell in a critical zone including both the first cell and the second cell. In some embodiments, the first value of the parameter associated with the second cell can be stored in a memory of the network optimization device in response to the performance of the first cell crossing the outage threshold in the first direction (in other words, being degraded). In some embodiments, the at least one parameter associated with the second cell can be, for example, at least one of a tilt value of an antenna associated with the second cell or a power value transmitted by the antenna associated with the second cell. In some embodiments, the at least one parameter associated with the second cell can be iteratively adjusted in response to a performance of the critical zone including the first cell and the second cell crossing a performance threshold.

At 506, the second value can be sent to the wireless network in response to the at least one parameter associated with the second cell being adjusted. In some embodiments, the network optimization device can be configured to also send to the wireless network commands and/or instructions, which can instruct the configuration of the second cell to be modified. In response to receiving the second value and the commands and/or instructions, the second cell can be configured to modify its configuration, such that the configuration for the second cell can be moved from the first configuration to a second configuration.

At 508, it can be determined at the second time that the performance of the first cell has crossed the outage threshold in a second direction opposite the first direction. The second direction can be a direction such that the performance of the first cell is improved when it crosses the outage threshold in the second direction. Thus, as a result of the configuration of the second cell being modified based on the second value, the performance of the first cell can be improved.

At 510, the at least one parameter associated with the second cell can be changed to the first value in response to the performance of the first cell crossing the outage threshold in the second direction. In some embodiments, the first value can be retrieved from the memory in response to determining that the performance of the first cell has crossed the outage threshold in the second direction.

At 512, the first value can be sent to the wireless network such that wireless network returns to the first configuration. As a result, the configuration modification applied at the second cell after the first time and before the second time can be undone, and the configuration of the second cell can be restored from the second configuration to the first configuration.

Figure 6:
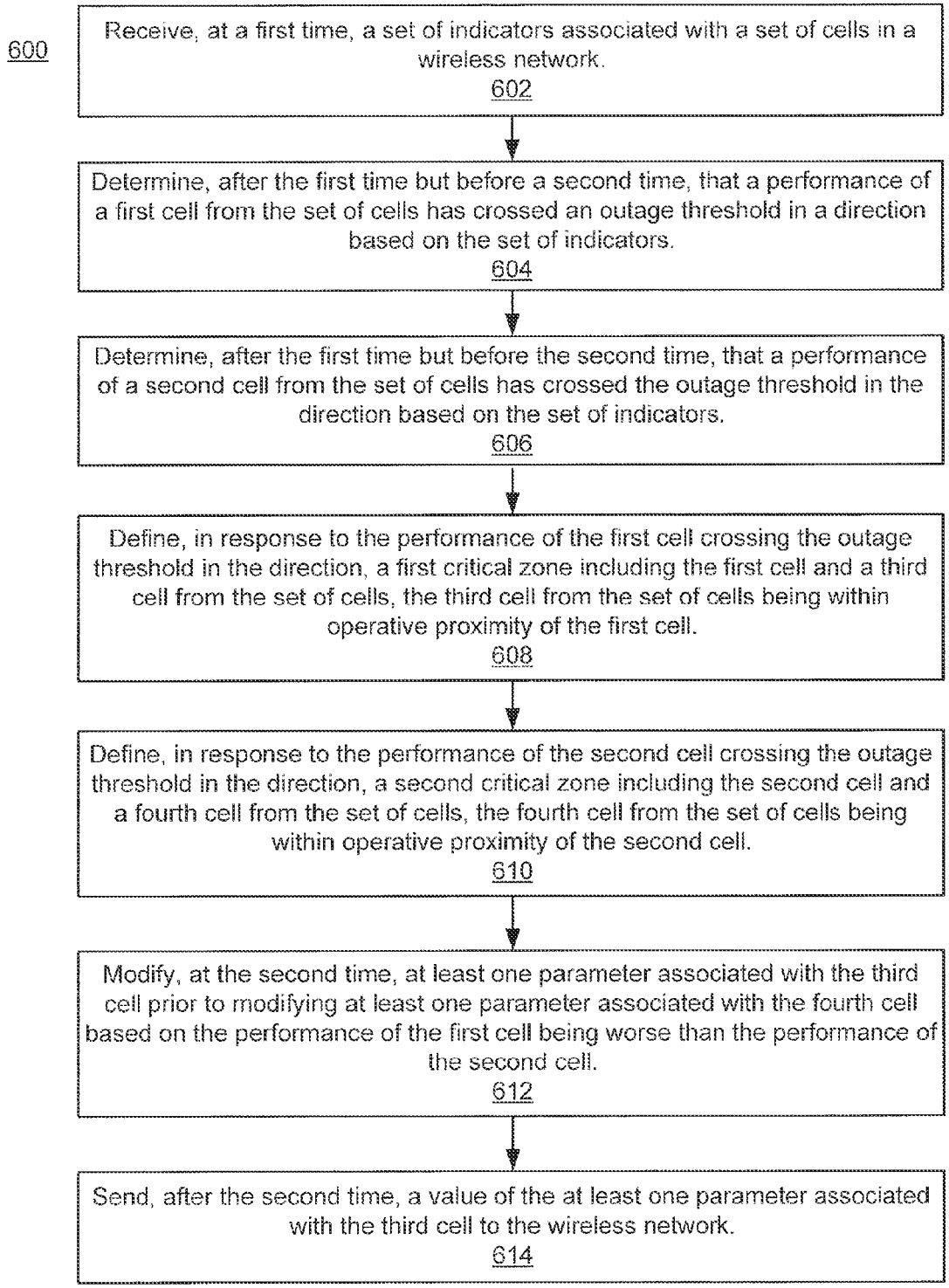
FIG. 6 is a flow chart illustrating an optimization method, according to another embodiment.

FIG. 6 is a flow chart illustrating an optimization process 600, according to another embodiment. Similar to the optimization process 500 described with respect to FIG. 5, the optimization process 600 is another example of an implementation of the methods described with respect to FIGS. 3 and 4, where multiple outage cells can be detected and their performance can be optimized or improved. The optimization process 600 can be executed at, for example, a network optimization device such as the network optimization device 200 shown and described with respect to FIG. 2. The network optimization device can include, for example, a monitor module, a detector module, a critical zone module, and an adjustment module, which are similar to the modules of the network optimization device 200 shown and described with respect to FIG. 2. Furthermore, the network optimization device can be operatively coupled to a wireless network that is similar to the wireless network 150 shown and described with respect to FIG. 1.

At 602, a set of indicators associated with a set of cells in a wireless network can be received at a first time. In some embodiments, the indicators can be received at the monitor module in the network optimization device. In some embodiments, the set of indicators can include, for example, at least one of a performance indicator, a network configuration parameter, mobile level measurements, or an indication of a network alarm. In some embodiments, the set of indicators can include, for example, a transmitted radio power level value of a cell from the set of cells, an SCR value of a cell, traffic statistical values associated with a cell, handover statistical values associated with a cell, or a DCR value associated with a cell.

At 604, it can be determined, after the first time but before a second time, that a performance of a first cell from the set of cells has crossed an outage threshold in a direction based on the set of indicators. In some embodiments, the determination can be made at the outage detect module in the network optimization device. In some embodiments, the performance of a cell is degraded when it crosses the outage threshold in the direction. Such a cell can be identified as an outage cell.

At 606, it can be determined, after the first time but before the second time, that a performance of a second cell from the set of cells has crossed an outage threshold in the direction based on the set of indicators. Similar to the first cell, the determination can be made at the outage detect module in the network optimization device.

At 608, in response to the performance of the first cell crossing the outage threshold in the direction, a first critical zone can be defined that includes the first cell and a third cell from the set of cells. The third cell can be within operative proximity of the first cell. In some embodiments, the third cell can be identified as a neighbor of the first cell. In some embodiments, the first critical zone can include one or more other detected outage cells, each of which has a performance that has crossed the outage threshold in the direction (in other words, being degraded) based on the set of indicators.

At 610, in response to the performance of the second cell crossing the outage threshold in the direction, a second critical zone can be defined that includes the second cell and a fourth cell from the set of cells. The fourth cell can be within operative proximity of the second cell. In some embodiments, similar to the first critical zone, the second critical zone can include one or more other detected outage cells, each of which has a performance that has crossed the outage threshold in the direction (in other words, being degraded) based on the set of indicators. Furthermore, in some embodiments, the first cell is not within operative proximity to (i.e., not a neighbor of) the second cell.

At 612, at least one parameter associated with the third cell can be modified at the second time prior to modifying at least one parameter associated with the fourth cell based on the performance of the first cell being worse than the performance of the second cell. As a result, the outage cell with the severer problem (i.e., the first cell) will be dealt with by the network optimization device before the outage cell with the less severe problem (i.e., the second cell). In some embodiments, the at least one parameter associated with the third cell (or the fourth cell) can be, for example, a tilt value of an antenna associated with the third cell (or the fourth cell) or a power value transmitted by the antenna associated with the third cell (or the fourth cell).

At 614, a value of the at least one parameter associated with the third cell can be sent to the wireless network after the second time. As a result, a configuration modification can be applied at the third cell. In some embodiments, it can be determined, at a third time after the second time, that the performance of the first cell has crossed the outage threshold in a direction opposite the previous direction. That is, the performance of the first cell has been improved such that the first cell is no more in the outage situation. Furthermore, the at least one parameter associated with the third cell can be restored, after the third time, to a value equal to a value for the at least one parameter at the first time.

In some embodiments, a value of the at least one parameter associated with the fourth cell can be sent to the wireless network after the configuration modification is applied at the third cell. As a result, a configuration modification can be applied at the fourth cell after that being applied at the third cell. Subsequently, it can be determined that the performance of the second cell has been improved such that the second cell is no more in the outage situation. In some embodiments, the performance of the first critical zone can be improved during a first time period, and the performance of the second critical zone can be improved during a second time period starting after the first time period. In some embodiments, the first time period and the second time period can partially overlap.

While method 400, method 500 and method 600 are described with respect to outage cells, in some embodiments, similar methods can be used with respect to low-performing cells. For example, an underperforming cell can be optimized using the method 400 (FIG. 4). When additional optimization is not possible within a low-performing cell, a network optimization device (e.g., network optimization device 100 of FIG. 1) can cause a wireless network (e.g., wireless network 150 of FIG. 1) to revert back to the best previous state similar to step 422 of method 400.

In some embodiments, cells with an amount of activity less than a threshold (e.g., low traffic cells) are not analyzed when determining critical zones. In such embodiments, although an outage or low-performing cell might be detected, it might not be overall beneficial to the network to use the resources of neighbor cells to remedy the outage or low-performance of the cell. Thus, in such embodiments, because the amount of activity within the cell is less than the threshold, a critical zone is not defined around the cell.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a monitor module implemented in at least one of a memory or a processing device, the monitor module configured to receive, from a wireless network, a plurality of indicators;
a detector module operatively coupled to the monitor module and configured to detect an underperformance condition during a time period and within a first cell from a plurality of cells of the wireless network based on the plurality of indicators; and
an adjustment module operatively coupled to the detector module, the adjustment module configured to iteratively adjust, during the time period, at least one parameter associated with a second cell from the plurality of cells to produce at least one adjusted parameter, the adjustment module configured to send the at least one adjusted parameter to the wireless network to improve performance of at least a portion of the wireless network during the time period, the second cell being within operative proximity to the first cell,
the adjustment module configured to restore, after the time period, the at least one parameter associated with the second cell to a value equal to a value for the at least one parameter prior to the time period, the adjustment module configured to send the value of the at least one parameter associated with the second cell to the wireless network.

2. The apparatus of claim 1, further comprising:
a critical zone module operatively coupled to the adjustment module and configured to define a critical zone including the first cell and a set of cells from the plurality of cells within operative proximity of the first cell; and
the adjustment module configured to iteratively adjust, during the time period, the at least one parameter associated with the second cell to improve performance of the critical zone.

3. The apparatus of claim 1, wherein the adjustment module is configured to store, in a memory, the value for the at least one parameter prior to the time period in response to the detector module detecting the underperformance condition within the first cell.

4. The apparatus of claim 1, wherein the plurality of indicators includes at least one of a transmitted radio power level value of the first cell, a successful call rate value of the first cell, traffic statistical values associated with the first cell, handover statistical values associated with the first cell, or a drop call rate value associated with the first cell.

5. The apparatus of claim 1, wherein the at least one parameter associated with the second cell is at least one of a tilt value of an antenna associated with the second cell or a power value transmitted by the antenna associated with the second cell.

6. The apparatus of claim 1, wherein the detector module is configured to detect underperformance condition within a third cell from the plurality of cells based on the plurality of indicators, the apparatus further comprising:
a critical zone module operatively coupled to the adjustment module and configured to define, based on the third cell being within operative proximity to the first cell, a critical zone including the first cell, the third cell, a set of cells from the plurality of cells within operative proximity of the first cell, and a set of cells from the plurality of cells within operative proximity of the third cell.

7. The apparatus of claim 1, wherein the detector module is configured to detect an underperformance condition within a third cell from the plurality of cells based on the plurality of indicators, the apparatus further comprising:
a critical zone module operatively coupled to the adjustment module and configured to define, based on the third cell not being within operative proximity to the first cell, a first critical zone including the first cell and a set of cells from the plurality of cells within operative proximity of the first cell and a second critical zone including the third cell and a set of cells from the plurality of cells within operatively proximity of the third cell,
the adjustment module configured to improve performance of the first critical zone prior to improving performance of the second critical zone based on a performance of the first critical zone being worse than a performance of the second critical zone.

8. The apparatus of claim 1, wherein the detector module is configured to detect the underperformance condition within the first cell by calculating a metric value using a first indicator from the plurality of indicators and a second indicator from the plurality of indicators, the detector module configured to calculate the metric value based on the first indicator having a weight greater than a weight of the second indicator.

9. The apparatus of claim 1, wherein the adjustment module is configured to select the second cell from the plurality of cells based on at least one of (1) a distance between the first cell and the second cell, (2) a number of call handovers between the first cell and the second cell before the time period, or (3) a location and azimuth of the first cell and a location and azimuth of the second cell.

10. The apparatus of claim 1, wherein the time period is a first time period, the detector module being configured to detect an underperformance condition within a third cell from the plurality of cells based on the plurality of indicators, the apparatus further comprising:
a critical zone module operatively coupled to the adjustment module and configured to define, based on the third cell not being within operative proximity to the first cell, a first critical zone including the first cell and a set of cells from the plurality of cells within operative proximity of the first cell and a second critical zone including the third cell and a set of cells from the plurality of cells within operatively proximity of the third cell,
the adjustment module configured to improve performance of the first critical zone during a second time period, the adjustment module configured to improve performance of the second critical zone during a third time period at least partially overlapping the second time period.

11. The apparatus of claim 1, wherein the plurality of indicators includes at least one of a performance indicator, a mobile level measurement, a network configuration parameter, or an indication of a network alarm.

12. The apparatus of claim 1, wherein the adjustment module is configured to restore, after the time period, the at least one parameter associated with the second cell to the value equal to the value for the at least one parameter prior to the time period in response to at least one of (1) the detector module detecting that the first cell does not include an underperformance condition, (2) the adjustment module determining that additional adjustments to the at least one parameter is not allowed, or (3) the adjustment module determining that an adjustment number threshold has been crossed.

13. The apparatus of claim 1, wherein the underperformance condition is an outage condition.

14. A non-transitory processor-readable medium storing code representing instructions to be executed by a processor, the code comprising code to cause the processor to:
determine, at a first time, that a performance of a first cell from a plurality of cells in a wireless network has crossed an outage threshold in a first direction, the wireless network having a first configuration at the first time;
adjust, after the first time but before a second time, at least one parameter associated with a second cell from the plurality of cells from a first value to a second value to compensate for the performance of the first cell;
send, in response to the at least one parameter associated with the second cell being adjusted, the second value to the wireless network such that the wireless network moves from the first configuration to a second configuration;
determine, at the second time, that the performance of the first cell has crossed the outage threshold in a second direction opposite the first direction;
change the at least one parameter associated with the second cell to the first value in response to the performance of the first cell crossing the outage threshold in the second direction; and
send the first value to the wireless network such that wireless network returns to the first configuration.

15. The non-transitory processor-readable medium of claim 14, further comprising code to cause the processor to:
store the first value in a memory in response to the performance of the first cell crossing the outage threshold in the first direction; and
retrieve the first value from the memory in response to determining that the performance of the first cell has crossed the outage threshold in the second direction.

16. The non-transitory processor-readable medium of claim 14, further comprising code to cause the processor to:
iteratively adjust, after the first time but before the second time, the at least one parameter associated with the second cell in response to a performance of a critical zone including the first cell and the second cell crossing a performance threshold.

17. The non-transitory processor-readable medium of claim 14, wherein the performance of the first cell is associated with at least one of a transmitted radio power level value of the first cell, a successful call rate value of the first cell, traffic statistical values associated with the first cell, handover statistical values associated with the first cell, or a drop call rate value associated with the first cell.

18. The non-transitory processor-readable medium of claim 14, wherein the at least one parameter associated with the second cell is at least one of a tilt value of an antenna associated with the second cell or a power value transmitted by the antenna associated with the second cell.

19. The non-transitory processor-readable medium of claim 14, further comprising code to cause the processor to:
receive, before the first time, a plurality of key performance indicators associated with the plurality of cells in the wireless network; and
define the performance of the first cell based on the plurality of key performance indicators.

20. A non-transitory processor-readable medium storing code representing instructions to be executed by a processor, the code comprising code to cause the processor to:
receive, at a first time, a plurality of indicators associated with a plurality of cells in a wireless network;
determine, after the first time but before a second time, that a performance of a first cell from the plurality of cells has crossed an outage threshold in a direction based on the plurality of indicators;
determine, after the first time but before the second time, that a performance of a second cell from the plurality of cells has crossed the outage threshold in the direction based on the plurality of indicators;

define, in response to the performance of the first cell crossing the outage threshold in the direction, a first critical zone including the first cell and a third cell from the plurality of cells, the third cell from the plurality of cells being within operative proximity of the first cell;

define, in response to the performance of the second cell crossing the outage threshold in the direction, a second critical zone including the second cell and a fourth cell from the plurality of cells, the fourth cell from the plurality of cells being within operative proximity of the second cell;

modify, at the second time, at least one parameter associated with the third cell prior to modifying at least one parameter associated with the fourth cell based on the performance of the first cell being worse than the performance of the second cell; and send, after the second time, a value of the at least one parameter associated with the third cell to the wireless network.

21. The non-transitory processor-readable medium of claim 20, further comprising code to cause the processor to:
determine, after the first time but before a second time, that a performance of a fifth cell from the plurality of cells has crossed the outage threshold in the direction based on the plurality of indicators, the fifth cell being within operative proximity of the third cell, the code to cause the processor to define the first critical zone including code to cause the processor to define the first critical zone including the first cell, the third cell, and the fifth cell.

22. The non-transitory processor-readable medium of claim 20, wherein the first cell is not within operative proximity to the second cell.

23. The non-transitory processor-readable medium of claim 20, wherein the plurality of indicators includes at least one of a transmitted radio power level value of the first cell, a successful call rate value of the first cell, traffic statistical values associated with the first cell, handover statistical values associated with the first cell, or a drop call rate value associated with the first cell.

24. The non-transitory processor-readable medium of claim 20, wherein the at least one parameter associated with the third cell is at least one of a tilt value of an antenna associated with the third cell or a power value transmitted by the antenna associated with the third cell.

25. The non-transitory processor-readable medium of claim 20, wherein the direction is a first direction, the code further comprising code to cause the processor to:
determine, at a third time after the second time, that the performance of the first cell has crossed the outage threshold in a second direction opposite the first direction; and
restore, after the third time, the at least one parameter associated with the third cell to a value equal to a value for the at least one parameter at the first time.

26. The non-transitory processor-readable medium of claim 20, wherein the plurality of indicators includes at least one of a performance indicator, a network configuration parameter, or an indication of a network alarm.

* * * * *

UNITED STATES PATENT AND TRADEMARK OFFICE
CERTIFICATE OF CORRECTION

PATENT NO. : 8,509,762 B2
APPLICATION NO. : 13/353893
DATED : August 13, 2013
INVENTOR(S) : Li et al.

It is certified that error appears in the above-identified patent and that said Letters Patent is hereby corrected as shown below:

In the Claims

Column 22, line 56, after "detect", insert --an--.

Column 25, line 24, change "a" to --the--.

Signed and Sealed this
Twelfth Day of November, 2013

Teresa Stanek Rea
*Deputy Director of the United States Patent and Trademark Office*